United States Patent
Traister et al.

(10) Patent No.: US 6,575,525 B2
(45) Date of Patent: Jun. 10, 2003

(54) REINFORCED DOOR FRAME FOR A MOTOR VEHICLE

(75) Inventors: Margaret E Traister, Troy, MI (US); Shing C Lo, Ann Arbor, MI (US); Frederick G Schwarze, Lake Orion, MI (US); Paul J Raona, Orion Township, MI (US); Michael K Slota, Macomb Township, MI (US); Stephen J Mitchell, Walled Lake, MI (US); John M Sweier, Rochester Hills, MI (US); Sheila A Wright, Bloomfield Hills, MI (US); Daniel R Warner, Grand Blanc, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/759,494

(22) Filed: Jan. 12, 2001

(65) Prior Publication Data

US 2002/0093219 A1 Jul. 18, 2002

(51) Int. Cl.$^7$ .................................................. B60J 5/04
(52) U.S. Cl. ..................................... 296/188; 296/146.6
(58) Field of Search .............................. 296/188, 203.3, 296/146.6, 146.11, 146.9, 189; 49/502, 503; 52/731.6

(56) References Cited

U.S. PATENT DOCUMENTS

| | | | | |
|---|---|---|---|---|
| 3,782,036 A | * | 1/1974 | Clark et al. ..................... 49/502 |
| 5,232,261 A | * | 8/1993 | Kuroda et al. ............... 296/188 |
| 5,404,690 A | * | 4/1995 | Hanf ....................... 296/188 X |
| 5,544,930 A | | 8/1996 | Stedman |
| 5,857,732 A | * | 1/1999 | Ritchie ................... 296/146.11 |
| 5,868,456 A | * | 2/1999 | kowalski et al. .......... 296/146.6 |
| 6,039,387 A | * | 3/2000 | Choi ........................... 296/188 |
| 6,135,541 A | * | 10/2000 | Geise et al. ................. 296/188 |
| 6,382,707 B1 | * | 5/2002 | Dunneback .................. 296/189 |

* cited by examiner

Primary Examiner—D. Glenn Dayoan
Assistant Examiner—Jason Morrow
(74) Attorney, Agent, or Firm—Donald J. Wallace

(57) ABSTRACT

The present invention provides a reinforced door assembly for a motor vehicle including a vehicle frame. The motor vehicle includes a B-pillar and a hinge pillar incorporating a hinge assembly. The reinforced door includes a door frame with a hinge shut face and a latch shut face. The door frame is attached to the hinge pillar of the motor vehicle by the hinge assembly which is attached to an outer side of the hinge shut face of the door frame. The reinforced door assembly further includes an offset intrusion beam with a first end and a second end. The first end of the offset intrusion beam is attached to an inner side of the hinge shut face by fasteners which also attach the hinge assembly to the outer side of the hinge shut face. The second end of the offset intrusion beam is attached to a reinforcement bracket which is attached to an inner side of the latch shut face through suitable fasteners. In the event of a frontal offset impact, the force of the impact causes the offset intrusion beam to protrude through the latch shut face so as to make contact with the B-pillar.

17 Claims, 5 Drawing Sheets

REINFORCED DOOR FRAME FOR A MOTOR VEHICLE

BACKGROUND OF THE INVENTION

1. Technical Field

The present invention generally relates to motor vehicles. More particularly, the present invention relates to a reinforced door frame for a motor vehicle.

2. Discussion

Structural reinforcements are commonly employed within motor vehicle doors to provide an increased level of protection against intrusion into the passenger compartment during a side or offset frontal impact collision. Such structural reinforcements are commonly referred to as "intrusion beams." Common forms of known intrusion beams range from tubular members which horizontally extend between inner and outer panels of a vehicle door to metal stampings welded to the frame of the door.

One specific structural reinforcement for a vehicle door is shown and described in U.S. Pat. No. 5,544,930 to Stedman. This patent describes a structural reinforcement having an energy absorbing tubular bar supported by first and second brackets. The tubular bar extends substantially across a length of the vehicle door approximately parallel to a lower edge of the door. The tubular bar has a first end and a second end and a longitudinal axis passing through the first and second ends. The first bracket retains the first end of the tubular bar such that there is predetermined amount of rotational float between the first bracket and the first end of the bar. The second bracket has a seat portion receiving and affixed to the second end of the bar. U.S. Pat. No. 5,544,930 is incorporated by reference as if fully set forth herein.

While the arrangement shown and described in U.S. Pat. No. 5,544,930 and many other prior known arrangements have proven to be commercially acceptable for their intended applications, they are all subject to improvement. In this regard, it is desirable to develop an intrusion beam which operates so as to maintain the dimensional relationship between a hinge pillar and a B-pillar of a motor vehicle.

SUMMARY OF THE INVENTION

It is a principal object of the present invention to provide an apparatus for reinforcing a vehicle door which functions to reduce intrusion into the passenger compartment in the event of a side impact collision.

It is a related object of the present invention to provide a vehicle door assembly which improves side impact energy management by transferring impact energy received by the door through the door hinges to the vehicle frame.

It is another object of the present invention to provide an apparatus for a vehicle door which operates to maintain dimensional properties of a front door opening during a frontal off-set impact by maintaining a dimensional relationship between a hinge pillar and a B-pillar.

In one form, the present invention provides a reinforced door assembly for a motor vehicle including a vehicle frame. The motor vehicle includes a B-pillar and a hinge pillar incorporating a hinge assembly. The reinforced door includes a door frame with a hinge shut face and a latch shut face. The door frame is attached to the hinge pillar of the motor vehicle by the hinge assembly which is attached to an outer side of the hinge shut face of the door frame. The reinforced door assembly further includes an offset intrusion barrier with a first end and a second end. The first end of the offset intrusion barrier is attached to an inner side of the hinge shut face by fasteners which also attach the hinge assembly to the outer side of the hinge shut face. The second end of the offset intrusion barrier is attached to a reinforcement bracket which is attached to an inner side of the latch shut face through suitable fasteners. In the event of a frontal offset impact, the force of the impact causes the offset intrusion barrier to protrude through the latch shut face so as to make contact with the B-pillar. In this manner, the intrusion barrier serves as a support between the hinge pillar and the B-pillar so as to maintain the dimensional relationship between the two pillars in the event of a collision.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
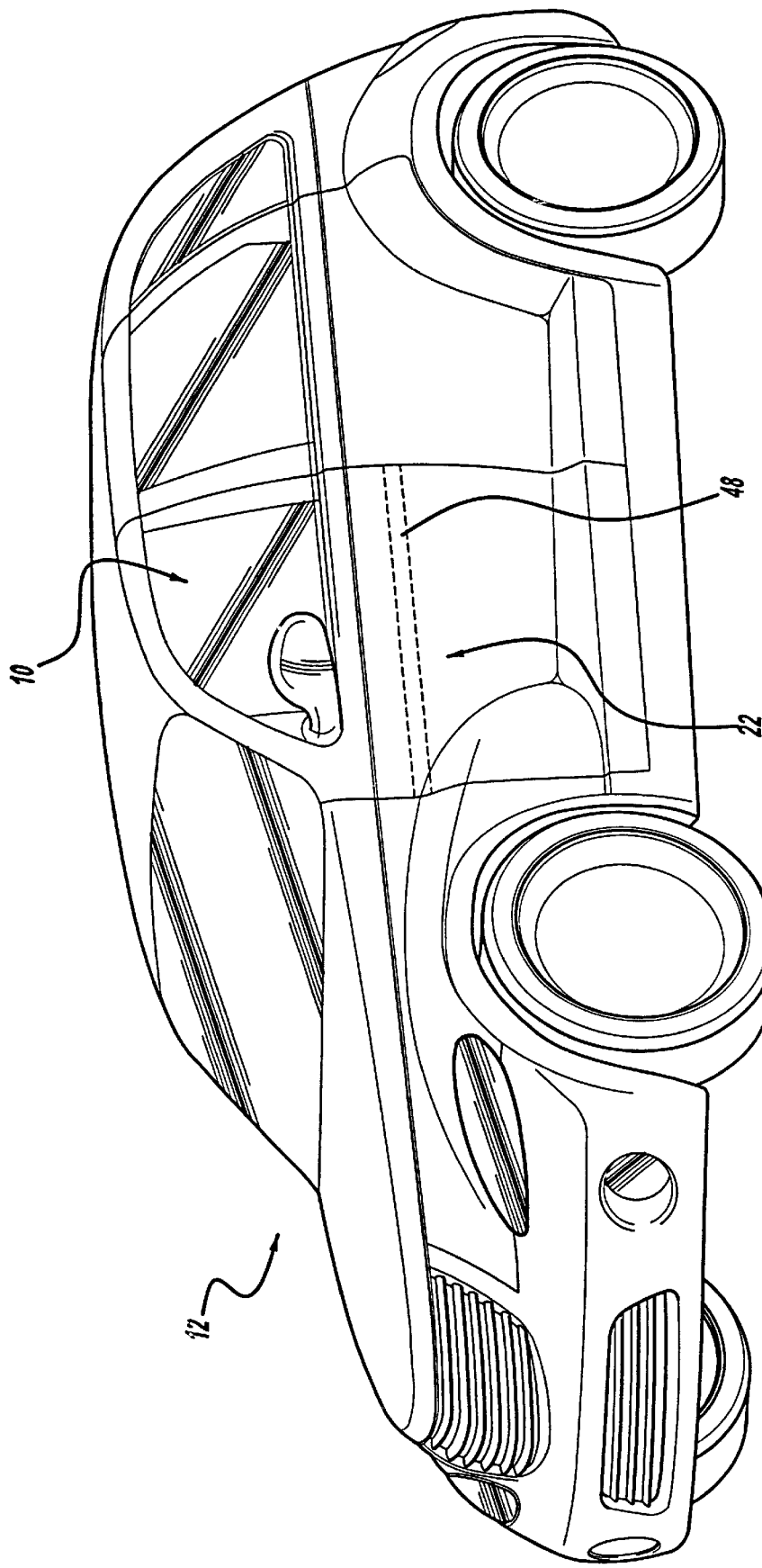
FIG. 1 is a perspective view of an exemplary motor vehicle shown incorporating a reinforced door assembly constructed in accordance with the teachings of a preferred embodiment of the present invention.
Figure 2:
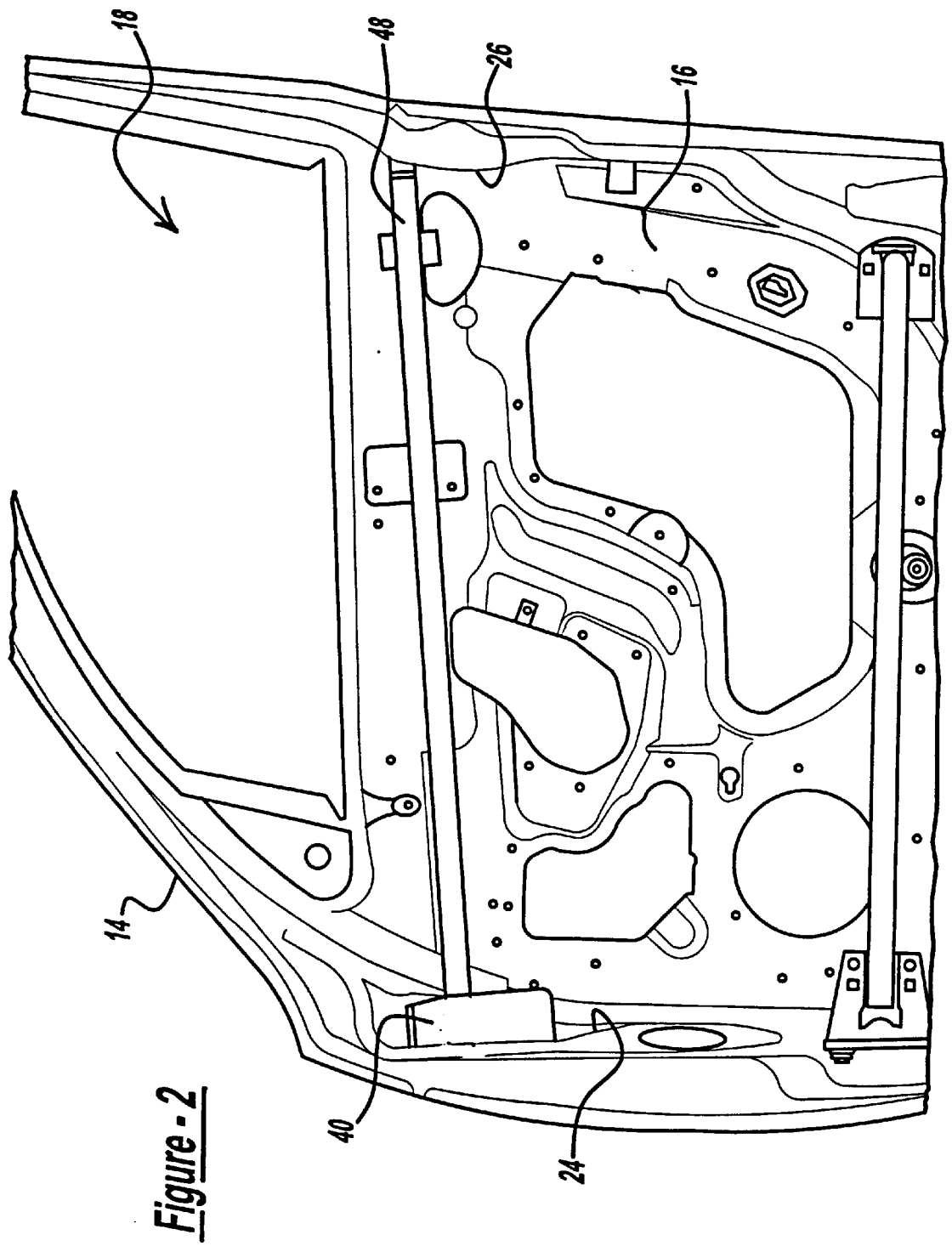
FIG. 2 is an enlarged view of the reinforced door assembly of FIG. 1 shown with the outer panel removed for purposes of illustration.

With initial reference to FIG. 1 of the drawings, a reinforced vehicle door assembly constructed in accordance with the teachings of a preferred embodiment of the present invention is generally identified with reference numeral 10. The reinforced vehicle door assembly 10 is shown operatively installed within an exemplary motor vehicle 12. However, it will become apparent to those skilled in the art that the teachings of the present invention have applicability to a wide range of vehicles.

With continued reference to FIG. 1 and additional reference to FIGS. 2 through 5, the reinforced vehicle door assembly 10 of the present invention will now be described in greater detail. The reinforced vehicle door assembly 10 is illustrated to conventionally include a door frame 14 with an inner panel 16. In the exemplary embodiment illustrated, the inner panel 16 is conventionally formed by stamping a sheet of metal to define a shape corresponding to that of an opening (not specifically shown) in the vehicle 12 in which it is incorporated. The inner panel 16 includes a lower generally rectangular portion and an upper generally trapezoidal portion. The upper portion generally defines a window opening 18. The intersection of the upper and lower portions is commonly referred to as the belt-line. Below the belt-line, the inner panel 16 is typically provided with a plurality of openings for access to internal mechanisms such as window regulators (not shown) which are operatively disposed within the vehicle door assembly 10 between the inner panel 16 and an outer panel 22.

The door frame 14 is preferably formed to further include a front shut face or hinge shut face 24 and a rear shut face or a latch shut face 26 connected by a bottom flange member. The hinge and latch shut faces 24 and 26 each intersect and are integrally formed with the inner panel 16 in a conventional manner. The hinge and latch shut faces 24 and 26 are disposed generally perpendicular to the inner panel 16.

The door frame 14 is attached to a hinge pillar of the motor vehicle 12 by way of a hinge assembly 30. The hinge assembly 30 includes a first generally planar portion 32 and a second generally planar portion 34. The first generally planar portion 32 extends forwardly from the second generally planar portion 34 in a generally perpendicular orientation. The first generally planar portion 32 is pivotally connected to the second generally planar portion 34. The first generally planar portion 32 includes a plurality of holes 36 for receiving suitable fasteners to attach the hinge assembly 30 to the hinge pillar (not shown). The second generally planar portion 34 abuts an outer surface 37 of the hinge shut face 24. Extending from the top and bottom of the second planar portion 34 are mounting extensions 38 of the hinge assembly 30 containing an aperture for receiving a fastener 39 so as to fasten the hinge assembly to the hinge shut face 24. The fasteners 39 extend through the hinge shut face 24 to engage apertures of a reinforcement bracket 40.

Figure 3:
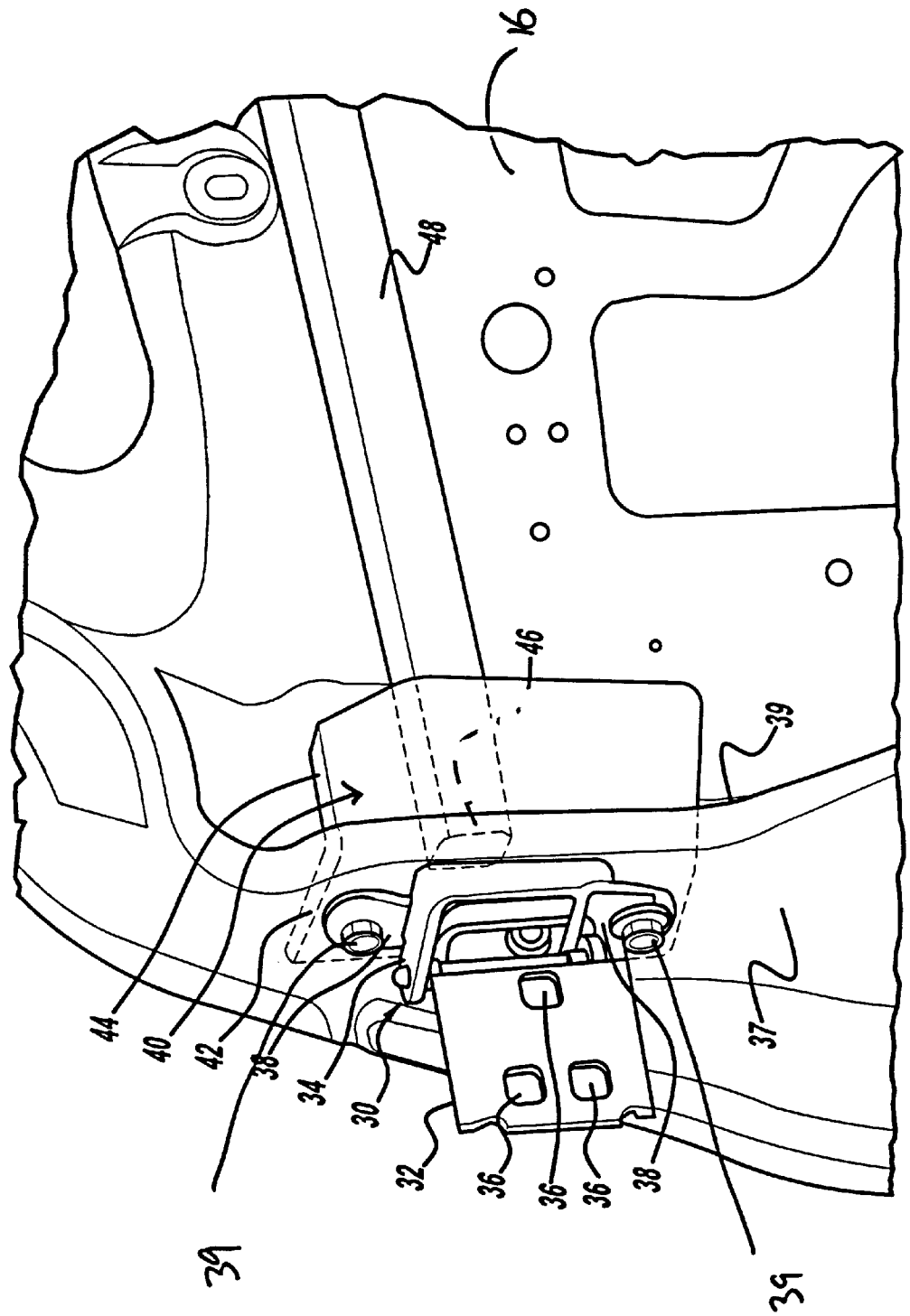
FIG. 3 is another enlarged view illustrating the cooperation between the first end of the intrusion beam, the hinge shut face, and a hinge assembly.
Figure 4:
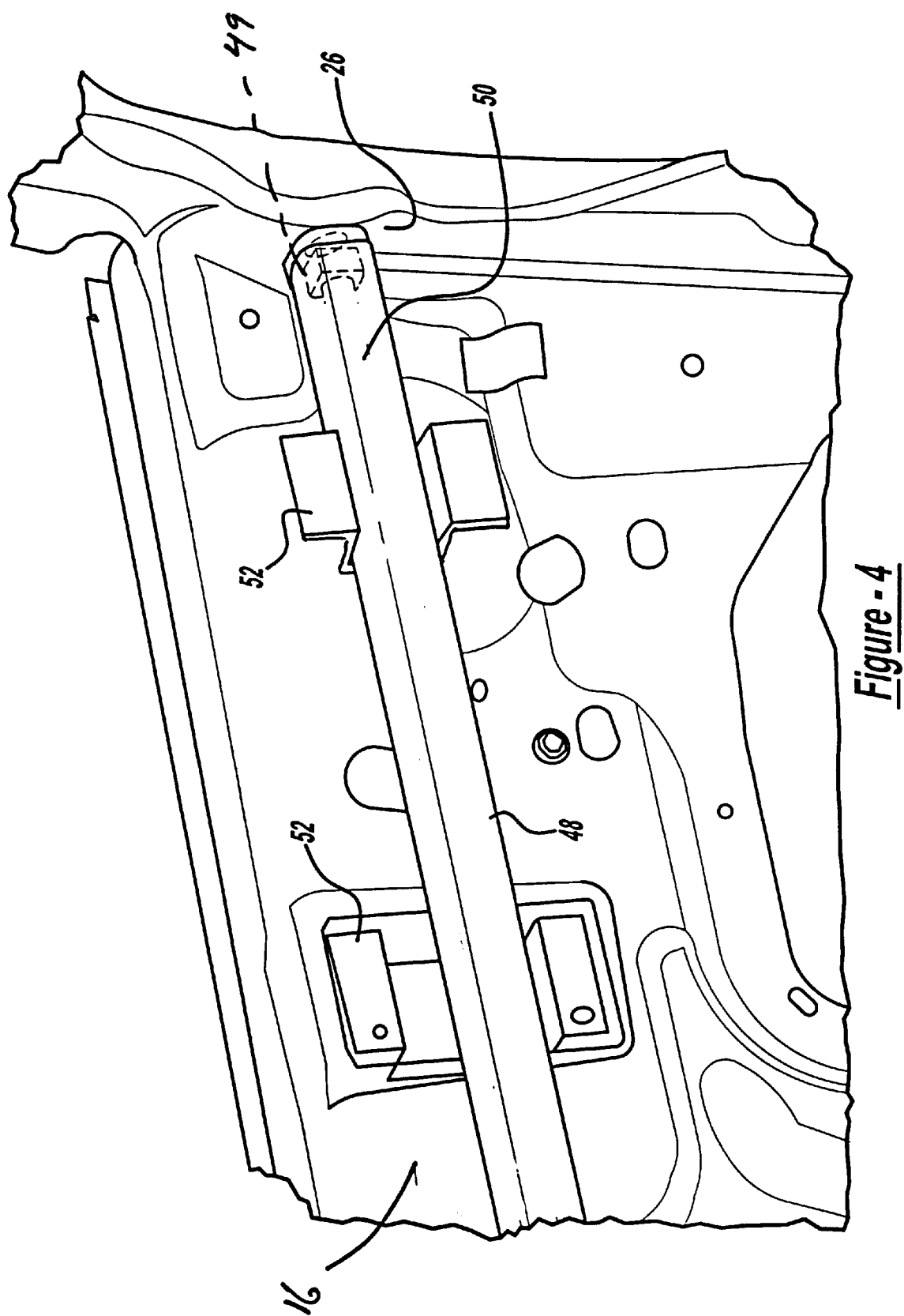
FIG. 4 is a another enlarged view illustrating the cooperation between the second end of the intrusion beam and the latch shut face.

The reinforcement bracket 40, which is shown most particularly in FIG. 3, contains a first generally planar portion 42 abutting the hinge shut face 24. The first generally planar portion 42 contains apertures for securing the first planar portion 42 abuttingly against the inner portion 29 of the hinge shut face 24. The reinforcement bracket 40 further contains a second generally planar portion 44. The second generally planar portion 44 extends rearwardly from the first planar portion 42 in a generally perpendicular orientation. The second generally planar portion 44 incorporates a first end 46 of an intrusion beam 48 which is welded or otherwise suitably fastened to an inner side of the second generally planar portion 44. The intrusion beam 48 is made from a material of suitable strength and in the embodiment illustrated has a square cross-section. The first end 46 extends approximately the entire length of the second generally planar portion 44 so as to generally form a right angle with the first generally planar portion 42.

The intrusion beam 48 extends the entire horizontal length of the inner panel 16 from the hinge shut face 24 to the latch shut face 26 where the intrusion beam terminates at a second end 50. At the second end 50 the intrusion beam 48 nearly abuts the latch shut face 26. The intrusion beam 48 contains an aperture at the second end 50 so as to allow a suitable fastener to engage a receptacle 49 of the latch shut face 26.

Upon the occurrence of a frontal offset impact, impact forces causes the hinge pillar to deform and be displaced in a direction toward the B-pillar of the motor vehicle 12. Such rearward displacement of the hinge pillar may displace the intrusion beam 48 in a rearward direction. To encourage the intrusion beam 48 to displace in a direction toward the latch shut face 26 and not bow in a direction toward an interior or exterior of the door frame 14, the inner panel 16 contains at least one strap or "hat" shaped bracket 52 to ensure that the intrusion beam remains in its original plane. The straps or "hat" shaped brackets 52 are attached to an outer panel of the door by suitable means such as welding. The brackets 52 also function to offset the intrusion beam 48 from the inner panel 16 of the frame. In this manner, the intrusion beam 48 is spaced from the inner panel 16, load is better directed longitudinally along the beam 48 during frontal impact and undesirable noise otherwise created from contact between the beam and the inner panel 16 is eliminated.

In one particular application, the intrusion beam 48 has a square configuration having a width (cross car) of 22 mm, a height of 22 mm, and wall thickness of 2.0 mm. The ends of the intrusion beam 48 preferably react with the hinge and B-pillars. The hinge and B-pillars may be overlapped with the door inner to provide a contact surface.

In the above manner, the intrusion beam 48 provides a reinforced support between the hinge pillar and B-pillar of the motor vehicle 12. Such a reinforced support serves to maintain the dimensional relationship between the hinge pillar and the B-pillar so as to minimize deformation of the door frame 14 in the event of an offset frontal collision event.

Figure 6:
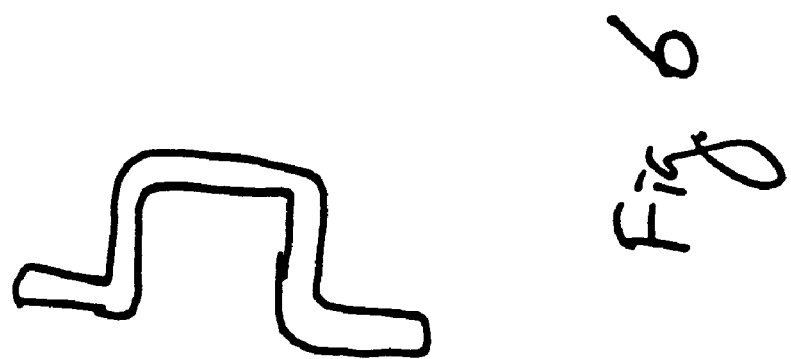
FIG. 6 is a cross-sectional view similar to FIG. 5 illustrating an alternative beam geometry.
Figure 5:
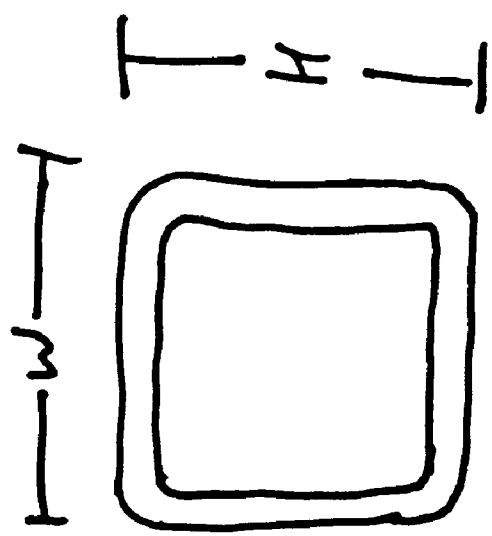
FIG. 5 is a cross-sectional view taken along the length of the intrusion beam.

With particular reference to FIG. 6, an alternative beam construction is illustrated. In this embodiment the beam 48 has a bat-shaped section. it will be understood that other cross-sections may be employed provided that they support the required loads.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A reinforced door assembly for a motor vehicle, the motor vehicle including a vehicle frame having a hinge pillar and a B-pillar, the reinforced door assembly comprising:

a door frame having an inner panel, a hinge shut face and a larch shut face;

a hinge assembly having a first portion and a second portion, the first portion being attached to the hinge pillar and the second portion being attached to an outer surface of the hinge shut face;

a reinforcement bracket attached to an inner surface of the hinge shut face;

an intrusion beam rigidly connecting to the hinge assembly through the reinforcement bracket and to an inner side of the latch shut face of the door frame and being spaced from the inner panel substantially along its entire length, whereby a rearward displacement of the hinge pillar can be communicated through the intrusion beam to the B-pillar to maintain the dimensional relationship between the hinge pillar and the B-pillar and to minimize deformation of the door frame.

2. The door assembly of claim 1, wherein the second portion is attached to the outer surface of the hinge shut face of the door frame with a plurality of fasteners.

3. The door assembly of claim 1, wherein the intrusion beam is a hollow square beam.

4. The door assembly of claim 1, wherein the intrusion beam has a generally hat-shaped cross section.

5. The door assembly of claim 2, wherein the reinforcement bracket has a first bracket portion abutting the hinge shut face in opposing relationship with the second portion of the hinge assembly, and a second bracket portion generally perpendicular to the first bracket portion, the intrusion beam secured to the second bracket portion.

6. The door assembly of claim 1, wherein the intrusion beam is attached to an inner side of the second bracket portion.

7. The door assembly of claim 1, wherein the door frame includes at least one "hat" shaped bracket retaining the intrusion beam in a position laterally offset from the inner panel.

8. A motor vehicle including a vehicle frame having a hinge pillar and a B-pillar and comprising:
- a door frame having an inner panel, a hinge shut face and a latch shut face;
- a hinge assembly having a first portion and a second portion, the first portion being attached to the hinge pillar and a second portion attached to an outer side of the hinge shut face of the door frame;
- a reinforcement bracket attached to the inner side of the hinge shut face of the door frame; and
- an intrusion beam rigidly connecting to the hinge assembly through the reinforcement bracket and to an inner side of the latch shut face, the intrusion beam secured to an inner side of the reinforcement bracket, whereby a rearward displacement of the hinge pillar can be communicated through the intrusion beam to the B-pillar to maintain the dimensional relationship between the hinge pillar and the B-pillar and to minimize deformation of the door frame.

9. The motor vehicle of claim 8, wherein the intrusion beam is offset from the inner panel of the door frame.

10. The motor vehicle of claim 8, wherein the intrusion beam is a hollow square beam.

11. The motor vehicle of claim 8, wherein the intrusion beam has a generally hat-shaped cross section.

12. The door assembly of claim 8, wherein the reinforcement bracket has a first bracket portion abutting the hinge shut face in opposing relationship with the second portion of the hinge assembly, and a second bracket portion generally perpendicular to the first bracket portion, the intrusion beam secured to the second bracket portion.

13. The door assembly of claim 8, wherein the door frame includes at least one "hat" shaped bracket retaining the intrusion beam in a position laterally offset from the inner panel.

14. The door assembly of claim 1, wherein the hinge shut face and latch shut face are solid and include substantially parallel inner and outer surface portions.

15. The door assembly of claim 1, wherein the hinge shut face and the latch shut face each include substantially parallel inner and outer surfaces.

16. The door assembly of claim 1, wherein the hinge assembly is attached to the reinforcement bracket through the hinge shut face.

17. A reinforced door assembly for a motor vehicle, the motor vehicle including
- a vehicle frame having a hinge pillar and a B-pillar, the door assembly comprising:
  - a door frame having an inner panel, a hinge shut face and a latch shut face, wherein the hinge shut face includes substantially parallel inner and outer surfaces;
  - a reinforcement bracket attached to the inner surface of the hinge shut face;
  - a hinge assembly having a first portion and a second portion, the first portion being attached to the hinge pillar and the second portion being attached to the reinforcement bracket through the hinge shut face; and
  - an intrusion beam rigidly extending between the reinforcement bracket and an inner surface of the latch shut face.

* * * * *